US011990304B2

(12) United States Patent
Ge et al.

(10) Patent No.: US 11,990,304 B2
(45) Date of Patent: May 21, 2024

(54) EXCITATION FUSE WITH A CONDUCTOR AND A FUSANT BEING SEQUENTIALLY BROKEN

(71) Applicant: XI' AN SINOFUSE ELECTRIC CO., LTD., Shaanxi (CN)

(72) Inventors: Xibin Ge, Shaanxi (CN); Shaobo Duan, Shaanxi (CN); Xiaoguang Shi, Shaanxi (CN); Rongrong Chen, Shaanxi (CN); Xin Wang, Shaanxi (CN); Wei Wang, Shaanxi (CN)

(73) Assignee: XI' AN SINOFUSE ELECTRIC CO., LTD., Shaanxi (CN)

( * ) Notice: Subject to any disclaimer, the term of this patent is extended or adjusted under 35 U.S.C. 154(b) by 271 days.

(21) Appl. No.: 17/622,159

(22) PCT Filed: Aug. 17, 2021

(86) PCT No.: PCT/CN2021/113103

§ 371 (c)(1),
(2) Date: Dec. 22, 2021

(87) PCT Pub. No.: WO2022/121363

PCT Pub. Date: Jun. 16, 2022

(65) Prior Publication Data

US 2023/0154713 A1 May 18, 2023

(30) Foreign Application Priority Data

Dec. 11, 2020 (CN) ......................... 202011458690.7
Jun. 24, 2021 (CN) ......................... 202110702549.5

(51) Int. Cl.
*H01H 85/05* (2006.01)
*H01H 85/143* (2006.01)
(Continued)

(52) U.S. Cl.
CPC .......... *H01H 85/05* (2013.01); *H01H 85/143* (2013.01); *H01H 85/165* (2013.01); *H01H 85/38* (2013.01)

(58) Field of Classification Search
CPC .... H01H 85/05; H01H 85/143; H01H 85/165; H01H 85/38
(Continued)

(56) References Cited

U.S. PATENT DOCUMENTS 2,931,874 A * 4/1960 Leaman ................. H01H 39/00 200/82 R
3,958,206 A * 5/1976 Klint ...................... H01H 85/38 337/296

(Continued)

FOREIGN PATENT DOCUMENTS

CN 208738069 U 4/2019
CN 208938906 U 6/2019

(Continued)

OTHER PUBLICATIONS

Decision to Grant a Patent for the Japanese Patent Application No. 2021-570382 issued by the Japanese Patent Office dated Oct. 24, 2023.

(Continued)

*Primary Examiner* — Anatoly Vortman
(74) *Attorney, Agent, or Firm* — IP & T GROUP LLP

(57) ABSTRACT

The present disclosure provides an excitation fuse with a conductor and a fusant being sequentially broken, the excitation fuse comprising a housing and a cavity in the housing, wherein at least one conductor is provided to be inserted in the housing and the cavity and has two ends connected with an external circuit; at least one fusant is provided in parallel on the conductor; an excitation device and a breaking device are mounted in the cavity at one side of the conductor; the
(Continued)

excitation device may receive an external excitation signal to act to drive the breaking device to sequentially form at least one fracture on the conductor and the fusant respectively; and at least one fracture on the conductor is connected in parallel with the fusant.

27 Claims, 6 Drawing Sheets

(51) Int. Cl.
*H01H 85/165* (2006.01)
*H01H 85/38* (2006.01)
(58) Field of Classification Search
USPC .......................................................... 337/187
See application file for complete search history.

(56) References Cited

U.S. PATENT DOCUMENTS

| | | | | |
|---|---|---|---|---|
| 4,417,519 | A * | 11/1983 | Lutz | F42C 19/06 200/61.08 |
| 5,877,563 | A * | 3/1999 | Krappel | H01H 39/006 200/61.08 |
| 6,556,119 | B1 * | 4/2003 | Lell | H01H 37/323 337/182 |
| 11,201,027 | B2 * | 12/2021 | Ehrhardt | H01H 89/00 |
| 2006/0049027 | A1 * | 3/2006 | Iversen | H01H 39/006 200/61.8 |
| 2013/0126326 | A1 * | 5/2013 | Borg | H01H 15/06 200/547 |
| 2015/0206681 | A1 * | 7/2015 | Marlin | H01H 1/365 200/82 R |
| 2016/0336131 | A1 * | 11/2016 | Fellmer | H01H 33/182 |
| 2017/0365434 | A1 | 12/2017 | Douglass et al. | |
| 2019/0371561 | A1 * | 12/2019 | Ehrhardt | H01H 39/006 |
| 2020/0066465 | A1 * | 2/2020 | Moszynski | H01H 9/32 |
| 2020/0286703 | A1 | 9/2020 | Tazarine et al. | |
| 2023/0141970 | A1 * | 5/2023 | Douglass | B60L 3/0046 337/157 |

FOREIGN PATENT DOCUMENTS

| | | | |
|---|---|---|---|
| CN | 110494946 | A | 11/2019 |
| CN | 110854000 | A | 2/2020 |
| CN | 210575811 | U | 5/2020 |
| CN | 111341627 | A | 6/2020 |
| CN | 112447461 | A | 3/2021 |
| CN | 113205984 | A | 8/2021 |
| FR | 3071659 | A1 | 3/2019 |
| GB | 2593941 | A | 10/2021 |
| JP | 2007042753 | A | 2/2007 |
| JP | 2009043575 | A | 2/2009 |
| JP | 2014049272 | A | 3/2014 |
| JP | 2017539019 | A | 12/2017 |
| WO | 2020071218 | A1 | 4/2020 |
| WO | 2020078313 | A1 | 4/2020 |
| WO | 2020204154 | A1 | 10/2020 |

OTHER PUBLICATIONS

International Search Report and Written Opinion for the PCT Application No. PCT/CN2021/113103 by the International Searching Authority dated Oct. 20, 2021.

Notification to Grant Patent Right for Invention of priority application CN 202110702549.5 issued by the Chinese Patent Office dated Jan. 31, 2024.

Office Action for the European Patent Application No. 21786074.1 issued by the European Patent Office dated Jul. 20, 2022.

Office Action for the Japanese Patent Application No. 2021-570382 issued by the Japanese Patent Office dated Mar. 9, 2023.

Office Action for the Korean Patent Application No. 10-2022-7008292 issued by the Korean Intellectual Property Office dated Dec. 25, 2023.

Office Action for the Chinese Patent Application No. 202110702549.5 issued by the Chinese Patent Office dated May 30, 2023.

Office Action for the Japanese Patent Application No. 2021-570382 issued by the Japanese Patent Office dated Jul. 20, 2023.

Extended European Search Report for the European Patent Application No. 21786074.1 issued by the European Patent Office dated Jun. 24, 2023.

* cited by examiner

EXCITATION FUSE WITH A CONDUCTOR AND A FUSANT BEING SEQUENTIALLY BROKEN

CROSS-REFERENCE TO RELATED APPLICATION

This application is a National Phase application of PCT application no. PCT/CN2021/113103 filed on Aug. 17, 2021, which claims the priority to a Chinese patent application No. 202011458690.7 filled with the Chinese Patent Office on Dec. 11, 2020 and entitled "Excitation Fuse with a Conductor and a Fusant being Sequentially Broken, and the priority to a Chinese patent application No. 202110702549.5 filled with the Chinese Patent Office on Jun. 24, 2021 and entitled "Excitation Fuse with a Conductor and a Fusant being Sequentially Broken", the contents of which are incorporated herein by reference in their entireties.

TECHNICAL FIELD

The present disclosure relates to the field of power controls and electric vehicles, particularly to an excitation fuse cutting off a current transmission circuit through external signal controlling.

BACKGROUND ART

Products for circuit overcurrent protection are fuses capable of being fused based on heat generated by the current flowing through the fuse, and there is a main problem of how to choose a hot-melting fuse that matches the load. For example, in the case of protecting a main loop of alternative fuel vehicles, if the load has a low multiple overload or is short circuited, selecting a fuse with a low-current specification cannot prevent short-term current overshoot; and if a fuse with a high-current specification is selected, the requirement for quick protection cannot be met. At present, the short circuit of the lithium battery packs that provide energy to alternative fuel vehicles is divided into a complete short circuit and an incomplete short circuit. In the case of the complete short circuit, the circuit is directly connected, having a large short-circuited current which can reach several thousand amperes. In the case of the incomplete short circuit, a conductor with a certain resistance is connected in series in the circuit to limit the current, resulting in a small short-circuited current even less than the rated current (depending on the resistance of the serially-connected conductor). In the case of the incomplete short circuit, the output current is approximately several times the rated current, but it is difficult for the current of this magnitude to fuse the fuse to be broken in time short enough, and the fuse cannot play a protective role, and it is sufficient for the current of this magnitude to damage circuit devices in the battery pack, causing the battery pack to heat up and ignite. Since the fusing caused by the heating of the withstand current and the heating of the dividing current is caused by the current flowing through the fuse, under a condition of a large rated current or a strong short-term overload/impact current (such as short-term large current when electric vehicles are started or climbing), this type of protection devices fused by the heating of the current cannot break a certain magnitude of fault current at a sufficiently fast breaking speed, or cannot break a certain magnitude of fault current at a sufficiently fast breaking speed while achieving a higher rated current, or withstanding a large overload/impact current without damage.

Another problem with the hot-melting fuse is that it cannot communicate with an external apparatus, and except for current, it cannot be triggered by signals such as signals sent from vehicle ECU, BMS or other sensors. If the circuit cannot be cut off in time when the vehicle is in a serious collision, or soaked in water, or the battery temperature is too high after exposure to the sun, it may lead to a serious event that the battery pack burns and eventually damages the vehicle.

At present, there is already a fuse with a fast-breaking cut-off opening structure on the market, which mainly comprises a gas generating device, an electrically conductive terminal, and an accommodating cavity for receiving the falling electrically conductive terminal, where the gas generating device generates a high-pressure gas to drive the piston to break the electrically conductive terminal, and the broken electrically conductive terminal falls down into the accommodating cavity, achieving the purpose of fast circuit disconnection. However, there are still some shortcomings and defects, for example, as limited by the arc extinguishing ability of air, it is difficult to break large fault currents; the arc is directly cooled by air, and the breaking capacity is greatly affected by air pressure, temperature and humidity; in the course of breaking, the arc directly burns the impact part of the piston knife, and the combustion of the piston knife will have an impact on the smooth arc extinguishing; in the course of breaking, except for the limited disturbance of the arc by the piston knife, there is no other structure or mechanism to assist in arc extinguishing, so the above fuse has limited arc extinguishing capacity and limited breaking capacity.

Based on the above disadvantage of the fuse assisting in arc extinguishing, the applicant has also developed a fuse in which a parallel fusant structure is used for assisting in arc extinguishing; a main electrically conductive terminal is disconnected by a driver to protect the circuit, and a fusant (melt) is connected in parallel on the main electrically conductive terminal for arc extinguishing. When the main electrically conductive terminal of the fuse is disconnected for circuit protection, an instantaneous large current will flow through the fusant and fuse the fusant, thereby achieving the purpose of arc extinguishing.

This type of excitation fuse with a parallel fusant also has certain defects: in actual use, after an electrically conductive plate is disconnected, the fusant may not be fused to be broken due to some unexpected reasons, or the fusing time is longer than the designed fusing time, and consequently the entire circuit cannot be completely disconnected in time, causing huge losses, especially in the operation and use of alternative fuel vehicles, serious accidents such as vehicle damage and personal injury may be caused. Therefore, it is essential to solve the technical problem of how to ensure that the fuse can be reliably broken.

SUMMARY

The technical problem to be solved by the present disclosure is to provide an excitation fuse with a conductor and a fusant being sequentially broken by a mechanical force, which can more effectively extinguish a large number of arcs generated when the fuse is disconnected, improving the breaking capacity while ensuring the reliability of disconnecting the fuse in the event of a fault.

In order to solve the above technical problem, the technical solution of the present disclosure provides an excitation fuse with a conductor and a fusant being sequentially broken, the excitation fuse comprising a housing and a cavity in the housing, wherein at least one conductor is provided in the housing and the cavity in a penetrating mode (i.e. being inserted in the housing and the cavity), and two ends of the conductor may be connected with an external circuit; at least one fusant is provided in parallel on the conductor; an excitation device and a breaking device are mounted in the cavity at one side of the conductor; the excitation device may receive an external excitation signal to act to drive the breaking device to sequentially form at least one fracture on the conductor and the fusant respectively; and the at least one fracture on the conductor is connected in parallel with the fusant.

A closed arc extinguishing chamber filled with an arc extinguishing medium is provided on the housing; and a part or all of the fusant is located in the arc extinguishing medium.

At least one set of force applying assemblies is provided on the fusant located in the housing, and the force applying assembly is driven by the breaking device, to break the fusant and forms a fracture.

The force applying assembly is provided above the fusant located outside the arc extinguishing medium; the force applying assembly comprises at least one set of clamping assemblies clamping the fusant; the breaking device may drive, after breaking the conductor, the clamping assembly to break the fusant in a linear or rotational displacement manner to form a fracture; when the fusant is broken in a rotating manner, two ends of the clamping assembly are fixed on the housing by a rotating shaft.

At least one set of the clamping assemblies is provided on the fusant, and a breaking notch is formed between the clamping assemblies; the breaking device impacts, after breaking the conductor, the breaking notch to break the fusant.

The conductor has a rotating weak portion, and the breaking device can break the conductor, where a fracture can be formed at each of the weak to-be-broken portions of the conductor, and the rotating weak portion is provided at one side or two sides of the weak to-be-broken portion to form a single-door or double-door pushing structure, the broken conductor can be pushed away by the breaking device and rotate around the rotating weak portion as a shaft without moving along with the breaking device, and a moving part of the breaking device passes through a gap formed by the rotation of the conductor.

The rotating weak portion of the conductor is provided at two sides of the weak to-be-broken portion of the conductor to form the double-door pushing structure, wherein after the breaking device breaks the conductor, the moving part of the breaking device passes through the gap formed by the rotation of the conductor; when a current flows through the conductor, an arc is formed between the two disconnected segments of the conductor (i.e. two segments of the conductor obtained after the breaking), and the arc is subjected to an action of the moving part of the breaking device and an action of an electromotive force, to surround a head of the moving part, and continues moving and elongating.

An arc extinguishing structure is provided inside the housing, and the arc extinguishing structure is located in or near an arc movement path of the double-door pushing structure, for extinguishing the arc between the two disconnected parts of the conductor ((i.e. two parts of the conductor obtained after the breaking)).

The breaking device comprises an impact end of an insulating material, the impact end of the insulating material can form an insulating wall with the housing after breaking the conductor, and the insulating wall can separate the disconnected conductors (i.e. parts of the conductor obtained after the breaking) at the two sides.

The breaking device comprises a fusant impact end, the fusant impact end is located at two sides of the impact end of the insulating material, and before the breaking device works, a distance from the impact end of the insulating material to the conductor is smaller than a distance from the fusant impact end to the fusant;

or, the fusant impact end is located below the impact end of the insulating material and is connected in series with the impact end of the insulating material, and before the breaking device works, the distance from the impact end of the insulating material to the conductor is smaller than the distance from the fusant impact end to the fusant.

The force applying assembly comprises at least one push rod and at least one guide rod, the arc extinguishing medium is filled around the push rod and the guide rod, and the fusant is located between the push rod and the guide rod; one end of the push rod passes through and extends out of the arc extinguishing chamber; one end of the guide rod may displace into a reserved displacement space in the arc extinguishing chamber or extend out of the arc extinguishing chamber; a blocking structure is provided between the push rod and the guide rod and the wall of the arc extinguishing chamber to prevent leakage of the arc extinguishing medium; after the breaking device breaks the conductor, the breaking device drives the push rod and the guide rod to displace in a linear manner to break the fusant, where the two disconnected segments of the fusant are a cathode and an anode respectively, and there is an arc path between the cathode and the anode; and the cathode and/or the anode remains in the arc extinguishing medium, and a part or all of the arc path is in the arc extinguishing medium.

When the cathode is in the arc extinguishing medium, the anode is in a slit between the push rod and the housing; or, when the anode is in the arc extinguishing medium, the cathode is in the slit between the push rod and the housing.

Between the push rod and the fusant, or between the guide rod and the fusant, there is no gap or there is a tiny gap, with the tiny gap having a size not sufficient for the arc generated between the two segments of the broken fusant to pass therethrough.

The force applying assembly comprises a rotating member rotatably provided in the arc extinguishing chamber and a trigger member located outside the arc extinguishing chamber; the rotating member abuts against or clamps the fusant; a blocking structure is provided between the rotating member and the arc extinguishing chamber to prevent leakage of the arc extinguishing medium; after the breaking device breaks the conductor, the breaking device may drive the trigger member to drive the rotating member to rotate, to break the fusant in a rotational displacement manner; and the disconnected fusants (i.e. fusant parts obtained by breaking the fusant) are a cathode and an anode respectively, and there is an arc path between the cathode and the anode; and the cathode and/or the anode remains in the arc extinguishing medium, and a part or all of the arc path is in the arc extinguishing medium.

When the cathode is in the arc extinguishing medium, the anode is in a slit between the rotating member and the housing; or, when the anode is located in the arc extinguishing medium, the cathode is in the slit between the rotating member and the housing.

The excitation device is a gas generating device, an air cylinder, or a hydraulic cylinder that can receive an external excitation signal to act; when the excitation device is a gas generating device, the breaking device is in sealed contact with a side wall of the housing or there is a gap less than 0.1 mm therebetween.

A weak to-be-broken portion that reduces the mechanical strength of the conductor and facilitates the breaking by the breaking device is provided on the conductor and/or the fusant.

The breaking device is provided with at least one impact end, and the impact end is provided as a contracted end face structure, a pointed structure, a beveled knife line structure, or a structure with two pointed ends and a concave middle.

The blocking structure is a seal provided between the force applying assembly and the wall of the arc extinguishing chamber; or there is an interference fit between the force applying assembly and the wall of the arc extinguishing chamber; or when the arc extinguishing medium is solid-granular, a gap between the force applying assembly and the wall of the arc extinguishing chamber is smaller than a particle diameter of the arc extinguishing medium.

The excitation fuse with a conductor and a fusant being sequentially broken of the present disclosure can be applied to a power distribution unit, or an energy storage apparatus, or an alternative fuel vehicle.

The excitation fuse with a conductor and a fusant being sequentially broken of the present disclosure can be applied to a power distribution apparatus, or an energy storage apparatus, vehicles or other fields in which the circuit protection is required.

BRIEF DESCRIPTION OF DRAWINGS

To illustrate the technical solution of the embodiment of the present disclosure more clearly, drawings required for use in the embodiments will be introduced briefly below. It should be understood that the following drawings show only some contents of the present disclosure and therefore should not be considered as a limitation to the scope, and those ordinary skilled in the art may obtain other related drawings in the light of the drawings without any inventive labor.

DETAILED DESCRIPTION OF THE EMBODIMENTS

Figure 1:
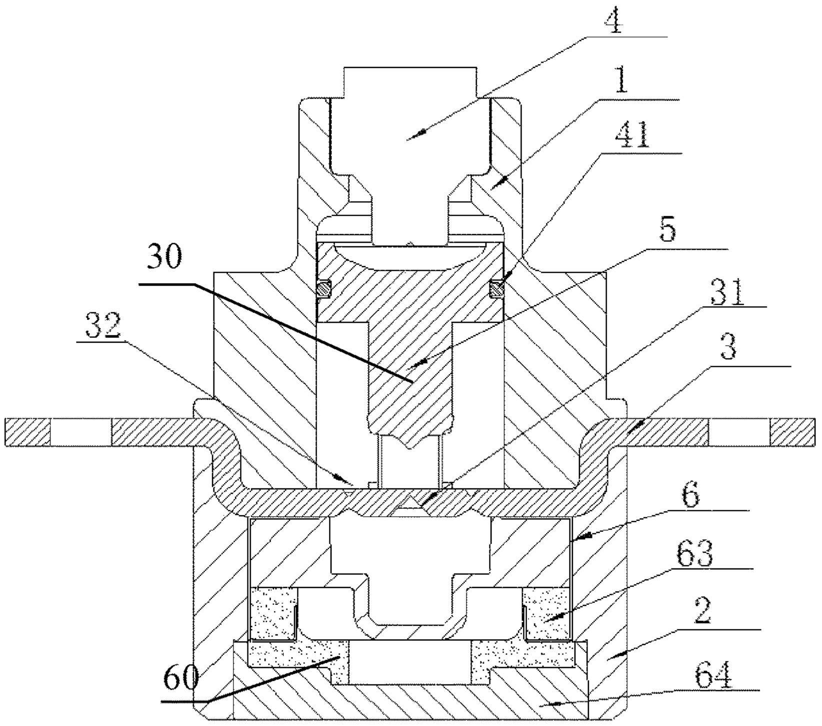
FIG. 1 is a structural schematic view of a longitudinal cross-section of a fuse of the present disclosure when not broken.

In order to make the object, technical solution and advantages of the embodiments of the present disclosure clearer, the technical solutions of the embodiments in the present disclosure will be clearly and completely described in the following with reference to the accompanying drawings in the present disclosure, and it is apparent that the described embodiment is some but not all of contents of the present disclosure. The assemblies of the present disclosure, which are generally described and illustrated in the figures herein, may be arranged and designed in a variety of different configurations.

Therefore, the detailed description of the embodiments of the present disclosure set forth in the accompanying drawings is not intended to limit the scope of the present disclosure, but illustrate only selected embodiments of the present disclosure. All the other embodiments, obtained by those skilled in the art in light of the embodiments of the present disclosure without inventive efforts, will fall within the scope of the present disclosure as claimed.

It should be noted that similar reference numerals and letters indicate similar items in the following figures, and therefore, once an item is defined in a drawing, it is not necessary to further define or explain it in the subsequent drawings.

In the description of the present disclosure, it should be indicated that orientation or positional relations indicated by terms such as “inside”, and “outside” are based on the orientation or positional relations as shown in the figures or orientation or positional relations that the product is usually placed in use, only for facilitating description of the present disclosure and simplifying the description, rather than indicating or implying that the referred devices or elements must be in a particular orientation or constructed or operated in the particular orientation, and therefore they should not be construed as limiting the present disclosure. In addition, terms such as “first”, and “second” are used only for distinguishing the description, and should not be understood as indicating or implying to have importance in relativity.

In the description of the present disclosure, it also should be indicated that unless otherwise expressly specified or defined, terms “provide”, and “connect” should be understood broadly, and for example, a connection may be a fixed connection, or a detachable connection, or an integrated connection; may be a mechanical connection or an electric connection; or may be a direct connection, or an indirect connection via an intermediate medium, or may be an internal communication between two elements. The specific meanings of the above-mentioned terms in the present disclosure could be understood by those skilled in the art according to specific situations.

Embodiment

Regarding the above technical solutions, embodiments are now provided and illustrated specifically in connection with the figures.

The excitation fuse (also called a trigger fuse) proposed in the embodiment of the present disclosure mainly comprises a housing, a conductor 3, a fusant 6, an excitation device 4 (also called a trigger device), and a breaking device.

Figure 2:
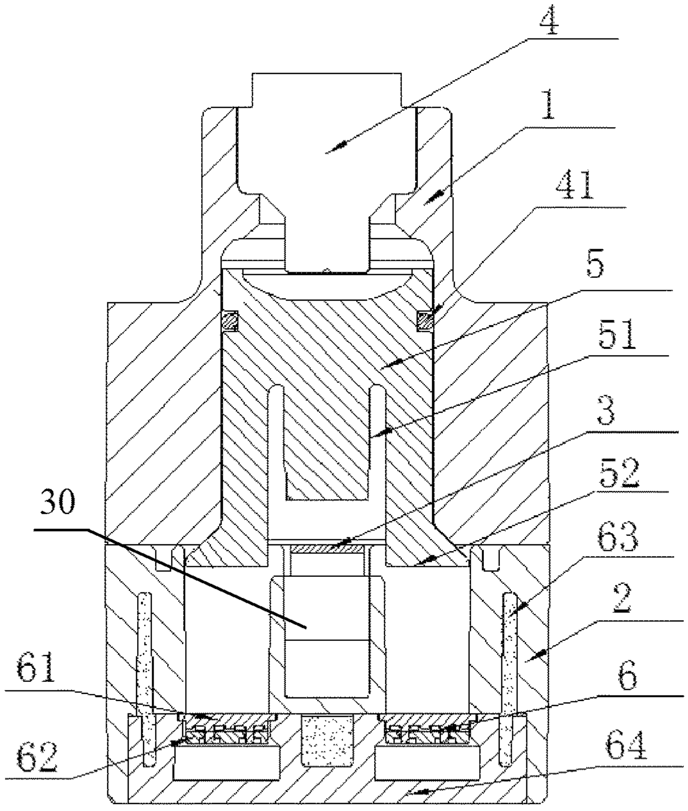
FIG. 2 is a schematic view of FIG. 1 from another perspective.

Referring to FIGS. 1 and 2, the housing comprises an upper housing 1 and a lower housing 2; one conductor 3 is provided between the upper housing 1 and the lower housing 2, and two ends of the conductor 3 extend out of the housing, and may be connected to an external circuit. The contact faces of the upper housing 1 and the lower housing 2 are sealed by a sealing device. The outer housing of the fuse is designed to be sealed with no vents, which can prevent foreign objects from contaminating the fracture and can also prevent high-temperature arcs from being sprayed out of the housing to damage surrounding devices, improving the protection level. The conductor 3 may also be all provided in the housing, and then two ends thereof are connected with an electrically conductive terminal respectively, the electrically conductive terminals being provided at two ends of the housing and extending out of the housing, where a connection with an external circuit is implemented through the electrically conductive terminals. The shape of the conductor 3 may be of a plate-like structure, and its cross-sectional shape may be of any shape, for example, a circular shape, a square shape, a special-shape, a tubular shape, etc., and a combination thereof. In the following description, the conductor 3 is illustrated by taking a plate-like structure as an example. There may be one conductor 3 or several conductors provided in parallel in the housing. Illustration is provided in the present disclosure by taking a structure of the upper housing 1 and the lower housing 2 as an example, and the housing may be a combination of a left housing and a right housing, not limited to a combination of an upper housing and a lower housing.

The current flows through two ends of the conductor 3 connected in series on the loop of the protection system, which will not have an adverse effect on the fusant 6. Moreover, because the conductor 3 has a large cross section and a low resistance, it has low heat generation and low power consumption, thus having a good current impact resistance.

The housings located on the upper face and the lower face of the conductor 3 are respectively provided with a through-cavity 30. In the cavity 30 of the upper housing 1 above the conductor 3, an excitation device 4 and a breaking device 5 are sequentially provided from top to bottom. A limiting step is provided in the cavity 30, and the excitation device 4 is mounted at the limiting step in the cavity 30, and is fixed on the housing by a pressing plate or a pressing sleeve (not shown). The excitation device 4 may be connected with an external control device (not shown) that sends an excitation signal, to receive the excitation signal from the control device, where the excitation signal is generally an electrical signal.

The excitation device 4 may also be a mechanism such as a cylinder, a hydraulic cylinder and a cam transmission device, which may receive an external excitation signal to act and provide a linear displacement drive for the breaking device 5. In the embodiment, the excitation device 4 is a gas generating device that stores chemical energy and is excited by a current, and the excitation device may act upon receiving a direct external excitation signal to generate a large amount of high-pressure gas and provide a driving force for the breaking device 5.

The breaking device 5 may be a structure such as piston and a sliding block, or a structure composed of the above members, as long as it can be driven by the excitation device 4 to cut off the conductor 3. When the excitation device 4 is a gas generating device, the breaking device 5 is in sealed contact with the side wall of the housing or there is a gap less than 0.1 mm therebetween. The sealed contact may be achieved by providing a seal 41 such as a sealing ring between the breaking device 5 and the cavity 30, or by an interference fit between the breaking device 5 and the cavity 30. For a piston with a dimension above the millimeter level, the typical gap has a size of 0.1 mm or less. A small amount of gas leakage will not affect the movement of the piston, and a good driving force can be obtained; if the piston is in sealed contact with the side wall of the housing, the obtained pushing force is greater, but the frictional force on the piston is generally greater. Therefore, whether the breaking device 5 is in sealed contact with the side wall of the housing or there is a gap retained therebetween is determined according to the driving force of the high-pressure gas generated by the gas generating device.

When the breaking device 5 is in an initial position, a limiting structure is provided between the breaking device 5 and the cavity 30. The limiting structure performs a function of maintaining the position of the breaking device 5 in the case of an external vibration, to prevent the breaking device 5 from accidentally breaking the conductor 3 and the fusant 6 due to vibration and other conditions, and to avoid from interfering the normal working of the apparatus mounted with the fuse.

The limiting structure may be protruding blocks provided at intervals on the outer circumference of the breaking device 5 and grooves provided at corresponding positions of the cavity 30, and the protruding block is engaged in the groove to achieve limiting; or protruding ribs are provided at intervals on the inner wall of the cavity 30, and the breaking device 5 is provided thereon with grooves correspondingly, and the protruding rib is engaged in the groove of the breaking device 5 to achieve limiting. When the excitation device 4 drives the breaking device 5 to act, the breaking device 5 can break the limiting structure and displace.

Figure 4:
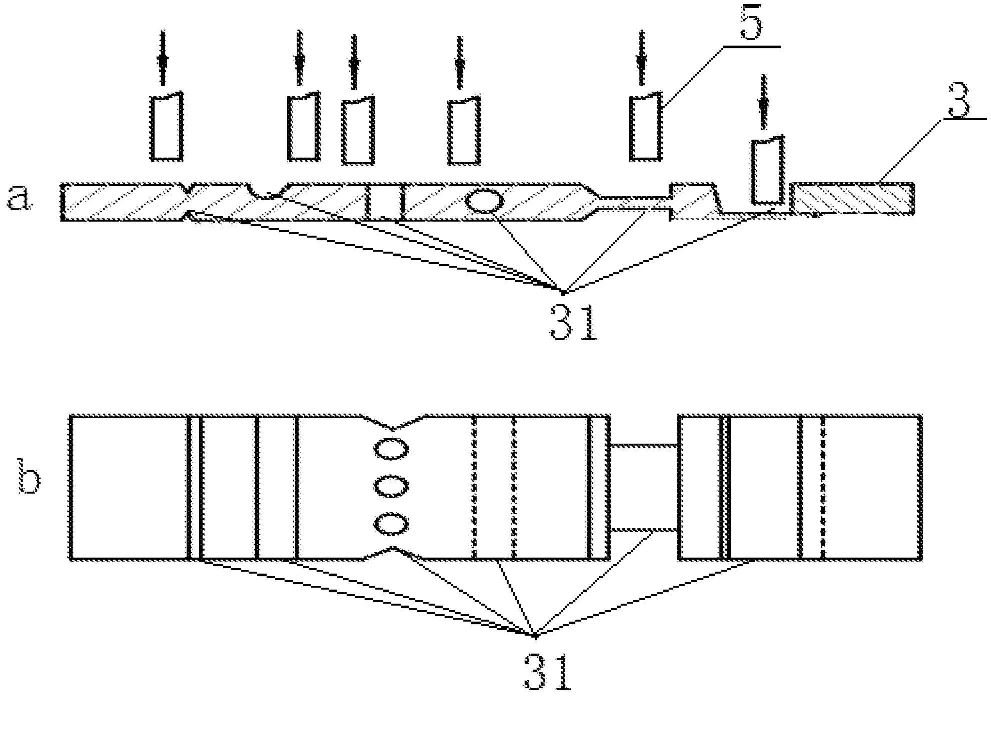
FIG. 4 is a structural schematic view of a weak to-be-broken portion on the conductor, where a in FIG. 4 is a side view of the conductor, and b in FIG. 4 is a front view of the conductor.

Referring to FIG. 1, the conductor 3 located in the cavity 30 of the housing is provided with a weak to-be-broken portion 31, and rotating weak portions 32 are provided at two sides of the weak to-be-broken portion 31 and near the wall of the housing of the cavity 30 in the housing. The purpose of providing the weak to-be-broken portion 31 is to reduce the mechanical strength of the conductor 3. Referring to FIG. 4, the following measures to weaken the strength of the fracture can be selectively used or can be used at the same time: reducing the cross-sectional area of the fracture, so that the weak to-be-broken portion 31 is formed into a structure with a reduced cross-sectional area, such as a U-shaped slot, a V-shaped slot, a hole, and a hollow structure, or a combination thereof; the weak to-be-broken portion 31 may be provided in the cross section of the conductor 3 at any angle, and a variable cross-section structure is adopted, enabling a stress concentration to be generated in the transition zone, such as leaving a gap or using shearing force; a low-strength conductor 3 material, such as tin, is adopted for the fracture; prefabricated fractures compressed and/or fixed by a mechanical force are adopted; and so on. Measures to weaken the strength of the fracture are not limited to the above measures. The conductors 3 on two sides of the weak to-be-broken portion 31 are respectively provided with a bending notch, and the bending notches help the conductor 3 to be bent along them after being broken. A bending notch may also not be provided.

The conductor 3 located in the housing can be provided in a straight-line flat shape, or can be provided in a downwardly-concave approximate Ω-shaped structure (i.e. a structure in an approximate shape of Chinese character "几" which is downwardly concave). The Ω-shaped structure may allow the conductor 3 to match with the upper housing 1 and the lower housing 2 and to position better. The lower housing 2 below the conductor 3 is provided with a space for the cut part to fall into after the conductor 3 is broken to form the fracture.

At least one fusant 6 is connected in parallel on the conductor 3 located in the housing. As shown in FIGS. 1 and 2, in the embodiment, two fusants 6 are connected in parallel on the conductor 3, and they are located on two sides of the conductor 3 respectively. The two ends of the fusant 6 are located at two ends of the weak to-be-broken portion 31. By connecting the fusant 6 in parallel on two sides of the fracture of the conductor 3, when the conductor 3 has a fracture generated, about 60-70% of most of fault current energy passes through the fusant 6 connected in parallel. Therefore, the provision of the fusant 6 connected in parallel may greatly reduce the fault current energy at the fracture of the conductor 3, and facilitate the rapid recovery of the insulation performance of the fracture, where the insulation performance can be restored within a few milliseconds; but when the fault current is small and is not enough to break, by fusing, the fusant 6 connected in parallel, or the time that the current flows through the fusant 6 connected in parallel is insufficient, the fusant 6 connected in parallel cannot be fused and broken in time or cannot be fused and broken, a situation where the circuit fails to be disconnected in time may be caused. Therefore, in the present disclosure, the breaking device 5 sequentially breaks the conductor 3 and the fuse 6 to disconnect the circuit, ensuring a reliability of breaking. The normal flow state is that the current mainly flows through two ends of the conductor 3, and only very weak current flows through the fusant 6 connected in parallel, so the fusant 6 can be regarded as a conductor.

Figure 3:
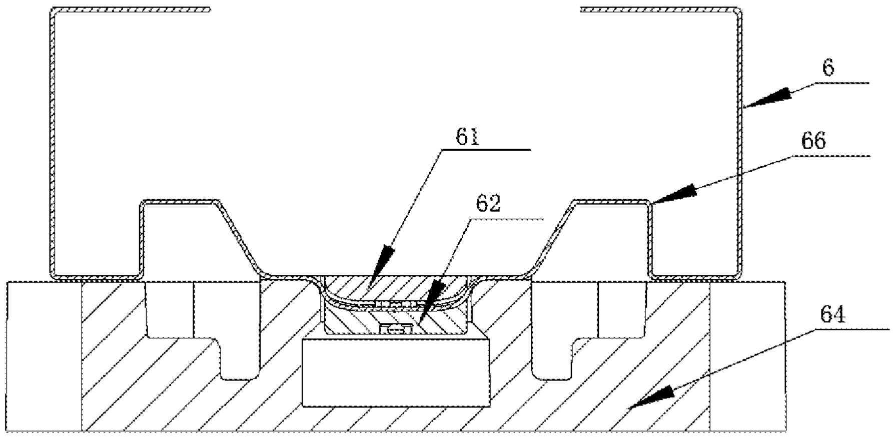
FIG. 3 is a structural schematic view of a fusant, a push plate and a guide plate.

The force applying assemblies are provided at upper and lower faces of the fusant 6 corresponding to the breaking device 5 respectively. The force applying assembly is a set of clamping assemblies, comprising a push plate 61 and a guide plate 62, provided at two faces of the fusant 6 for clamping the same. Referring to FIGS. 1 and 3, the push plate 61 and the guide plate 62 are connected with each other to fix the fusant 6 between the push plate 61 and the guide plate 62, so that the push plate 61 and the guide plate 62 form a set of clamping assemblies fixed relative to each other. The push plate 61 and the guide plate 62 are fixed on the housing by a positioning structure (not shown). When the push plate 61 is driven by the breaking device 5, the push plate can overcome the positioning of the positioning structure, and displace and break the fusant 6. An arc extinguishing chamber 60 is provided in the housing on two sides of the push plate 61 and the guide plate 62, the arc extinguishing chamber 60 is filled with an arc extinguishing medium 63, and the fusant 6 penetrates through the arc extinguishing chamber 60 and then is connected with the conductor 3. The fusant 6 is provided thereon with a weak to-be-fused portion and a weak to-be-broken portion 31 of the fusant 6 that is mechanically broken. The provisions of the weak to-be-fused portion and the weak to-be-broken portion 31 do not affect each other, that is, the mechanical breaking of the fusant 6 will not affect the fusing of the fusant 6, and the fusing of the fusant 6 does not affect the mechanical breaking of fusant 6. In the above, the arc extinguishing medium 63 may be a combination of densely filled scattered particles and colloids, or may be a liquid, which can be selected as actually required by arc extinguishing. The arc extinguishing medium prevents the expansion of the arc at the fracture of the fusant 6.

In the course of the breaking, with the combination of quick cutting and the principle of fuse arc extinguishing, the breaking capacity is basically not affected by air pressure, temperature and humidity, and the arc extinguishing capacity is improved. Therefore, a larger fault current can be broken and the breaking capacity can be improved.

The weak to-be-fused portion is provided in the arc extinguishing medium 63, and the weak to-be-broken portion 31 may be provided in the arc extinguishing medium 63 or may be provided on the fusant 6 outside the arc extinguishing medium 63 and close to one side or two sides of the push plate 61 and the guide plate 62. When the fusant 6 is provided in a bending manner, the weak to-be-broken portion 31 may be provided at the bending of the fusant 6 to facilitate breaking of the fusant 6. The weak to-be-fused portion may be a narrow-diameter structure or a structure or a material where a low-temperature melting metal is coated on the surface of the fusant 6 to produce a metallurgical effect layer etc. to accelerate the fusing speed, or a segment of material having a low melting point jointed on the fusant 6.

The structure of a part of the fusant 6 located in the arc extinguishing chamber 60 is provided as a trapezoidal structure 66, as shown in FIG. 3, where a side connected with the fusant 6 located between the push plate 61 and the guide plate 62 is provided as an oblique line, and the weak to-be-broken portion 31 is provided at the bending of the trapezoidal structure. In this way, the fuse 6 is more easily tensed/pulled to be broken when breaking the fuse 6.

A space for downward displacement of the guide plate 62 is provided in the housing directly below the guide plate 62, and a buffer layer is provided at the bottom of the space. The height of the space is at least greater than the displacement distance of the guide plate 62 after the fusant 6 is pulled to be broken.

In the production of the fuse, in order to facilitate assembling, the part of the lower housing 2 located below the fusant 6 is processed separately from the other parts of the lower housing 2 to form a fusant bottom shell 64. In FIG. 3, a part of the arc extinguishing chamber 60 with an upward opening, and a space below the fusant 6 are provided on the fusant bottom shell 64, and then the guide plate 62 is provided on the opening in the space below the fusant 6 through a limiting structure, and then the fusant 6 is fixedly provided on the fusant bottom shell 64, and finally the push plate 61 is provided thereon, so that the fusant 6, the push plate 61, the guide plate 62, and the space below the fusant 6, and the part of the arc extinguishing chamber 60 etc. form an integrated structure. The lower housing 2 is provided thereon with a part of the arc extinguishing chamber 60 corresponding to the fusant bottom shell 64 and a space below the conductor 3 respectively. A mounting notch with a downward opening is formed in the lower housing 2. During mounting, the fusant 6 and the integrated structure portion therebelow are integrally mounted on the lower housing 2 to form a seal at the contact surface with the lower housing 2. The part of the arc extinguishing chamber 60 of the fusant bottom shell 64 is jointed with the part of the arc extinguishing chamber 60 of the lower housing 2 to form a complete sealed chamber, and they can then be fixed by a screw. With this structure, the difficulty of processing can be reduced, and the assembling time can be shortened.

The fusant 6 may be provided at a certain distance directly below the conductor 3, or provided below an outer side on two sides of the edge of the conductor 3. Regardless of the position of the fusant 6, the condition to be met is that the fusant 6 can also be broken after the impact end of the breaking device 5 impacts to break the conductor 3. Therefore, a vertical distance between the structure of the impact end of the breaking device 5 or the conductor 3 and the fusant 6 may be determined according to an interval time required to break the conductor 3 and the fusant 6. When the fusant 6 is located below an outer side on two sides of the edge of the conductor 3, the impact end of the breaking device 5 may be provided as three independent parts: an impact end 51 that is facing the broken part of the conductor 3 and that is of an insulating material, and a fusant impact end 52 that is located at two sides of the impact end 51 of the insulating material and configured to break the fusant 6, thereby breaking the conductor 3 and the fusant 6 respectively. Since the fusant 6 is located below the conductor 3, the fusant impact end 52 and the impact end 51 of the insulating material are provided, with one being lower than the other. The distances from the fusant impact end 52 and the impact end 51 of the insulating material to the fusant 6 and the conductor 3 respectively are determined according to the interval time for breaking the conductor 3 and the fusant 6, and the conductor 3 and the fusant 6 are broken according to the interval time one after another.

In the above, in the embodiment the distance from the impact end 51 of the insulating material to the conductor 3 is smaller than the distance from the fusant impact end 52 to the fusant 6, to ensure the conductor 3 and the fusant 6 can be sequentially broken. It is optional that the fusant impact end 52 is located below the impact end 51 of the insulating material and is connected in series with the impact end 51 of the insulating material. Before the breaking device 5 works, the distance from the impact end 51 of the insulating material to the conductor 3 is smaller than the distance from the fusant impact end 52 to the fusant 6. The case where the fusant impact end 52 is located below the impact end 51 of the insulating material can perform the same function, and can also be selected according to a space arrangement of the product.

Further, the impact end 51 of the insulating material can move to a position where it contacts the housing, and forms an insulating wall with the housing, so that the conductors 3 on two sides are separated after being broken. In the embodiment, the width of the impact end 51 of the insulating material is greater than the width of the conductor 3 to form the insulating wall. Of course, other methods that can form the insulating wall can also be selected. Since the fusant 6 will have an instantaneous overvoltage in the course of being fused or broken, two isolated chambers are formed under the separation of the insulating wall, which may avoid the overvoltage from passing through the air to break through the upper fracture, thereby preventing re-ignition; in the course of forming two independent chambers at two ends of the fracture, the arc may be squeezed into the slit to facilitate arc extinguishing. The formation of the insulating wall improves the reliability of the fuse of the present disclosure.

The end faces of the impact end 51 of the insulating material and the fusant impact end 52 may be provided as a pointed end structure, a blade-like structure, a contracted end face structure, a beveled knife structure or a narrow flat structure, etc., to facilitate cutting off the weak to-be-broken portion 31 on the conductor 3 and the fusant 6 to from a fracture. When the fusant 6 is provided with clamping assemblies in a plate-like structure such as the push plate 61 and the guide plate 62 as shown in FIG. 3, the end face of the fusant impact end 52 is provided as a flat structure, facilitating breaking the fusant 6 by pushing the push plate 61.

When the fusant 6 is directly below the conductor 3, the breaking device 5 only needs one impact end. With this structure, the impact end of the breaking device 5 first breaks the conductor 3, and then continues to displace, and breaks the fusant 6 by the impact end that breaks the conductor 3, forming fractures on the conductor 3 and the fusant 6 one after another.

Figure 5:
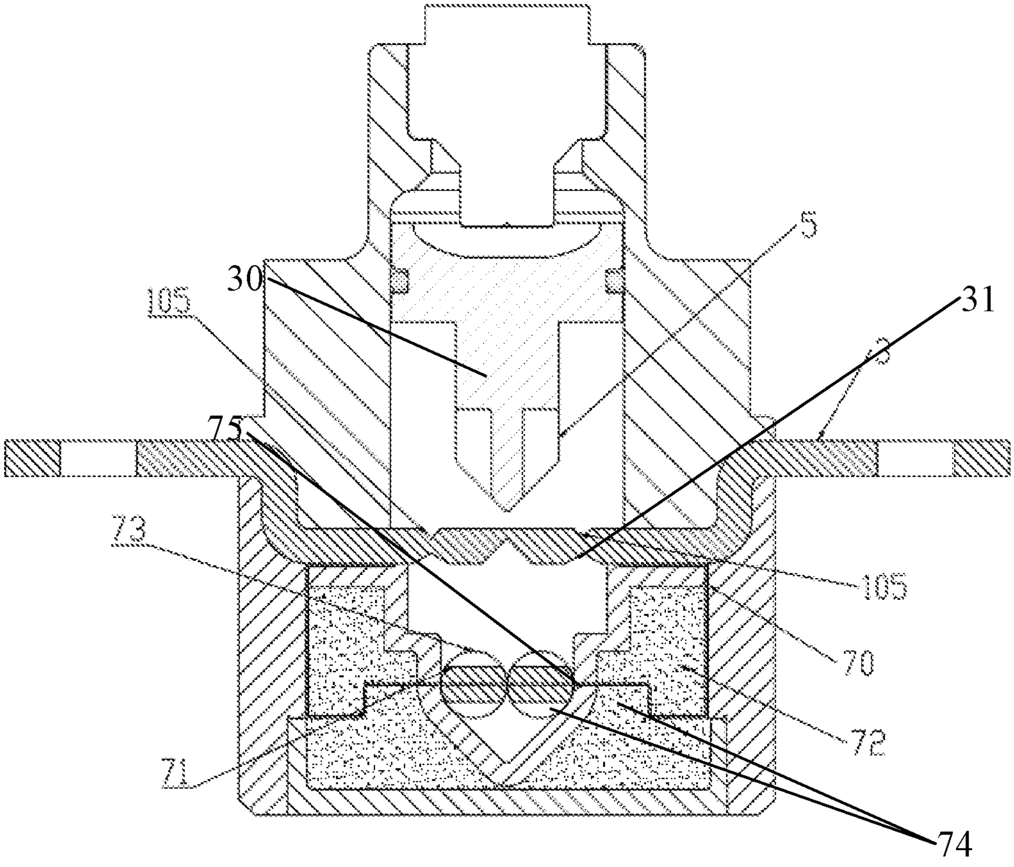
FIG. 5 is a structural schematic view of a cross-section of a fuse of the present disclosure with another optional structure when not broken.
Figure 6:
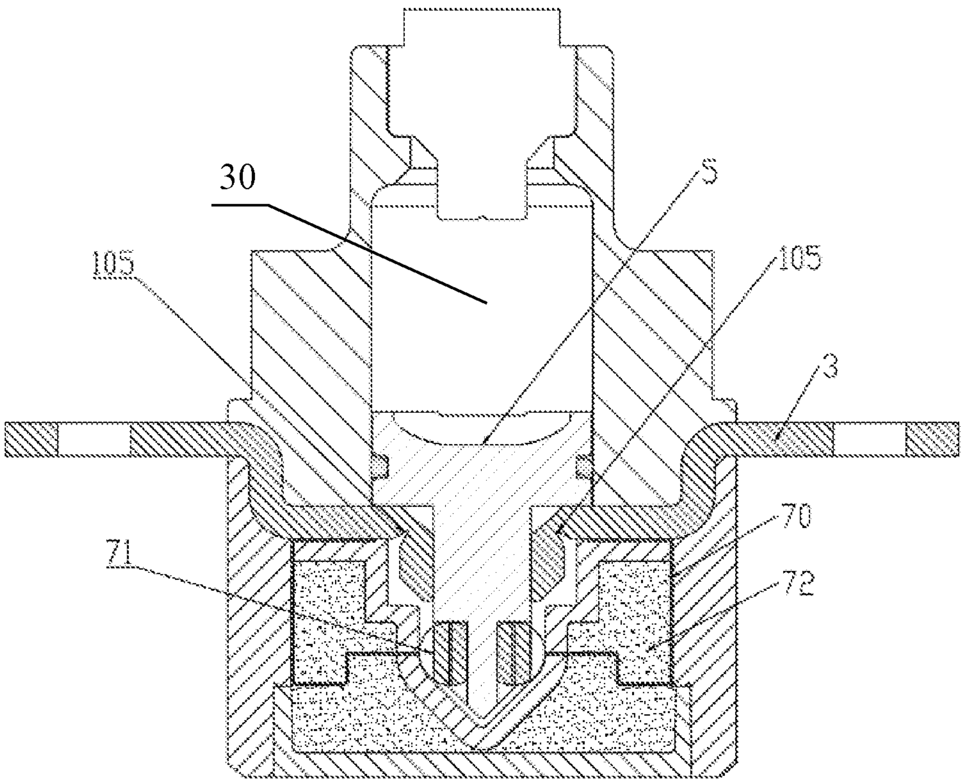
FIG. 6 is a structural schematic view of a cross-section of the fuse in FIG. after being broken.

Referring to FIGS. 5 and 6, the conductor 3 has a rotating weak portion 105, and the breaking device 5 can break the conductor 3, where a fracture can be formed at each of the weak to-be-broken portions of the conductor 3, and the rotating weak portion 105 is provided at one side or two sides of the weak to-be-broken portion 31 to form a single-door or double-door pushing structure, the broken conductor 3 can be pushed away by the breaking device 5 and rotate around the rotating weak portions 105 as a shaft without moving along with the breaking device 5, and the moving part of the breaking device 5 passes through the gap formed by the rotation of the conductor 3. In the embodiment, the rotating weak portions 105 are provided at two sides of the weak to-be-broken portion 31. When the breaking device 5 breaks through the conductor 3 downward to form a single breaking point, the conductor 3 continues to be pushed by the breaking device 5 and rotates with the rotating weak portion 105 as an inflection point, just like pushing to open two doors without falling, and will not erect due to falling and jam the breaking device 5. Thus, it is ensured that the breaking device 5 continues to move downward, ensuring continuously breaking the fusant 70. It can be understood that the embodiment provides a double-door form with two rotating weak portions 105. Providing only one rotating weak portion 105 can also be considered, and the conductor 3 is broken through like a single-door when pushed. Regardless of a single-door or a double-door, the provision of the rotating weak portion(s) 105 can make the applying force of the breaking device 5 smaller and more uniform, and the conductor 3 can be broken through while maintaining a uniform breaking force, and the arc at the breaking point is allowed to be stretched, with the breaking of the conductor 3, into a U shape along the breaking direction, which is beneficial to extinguishing the arc.

Figure 10:
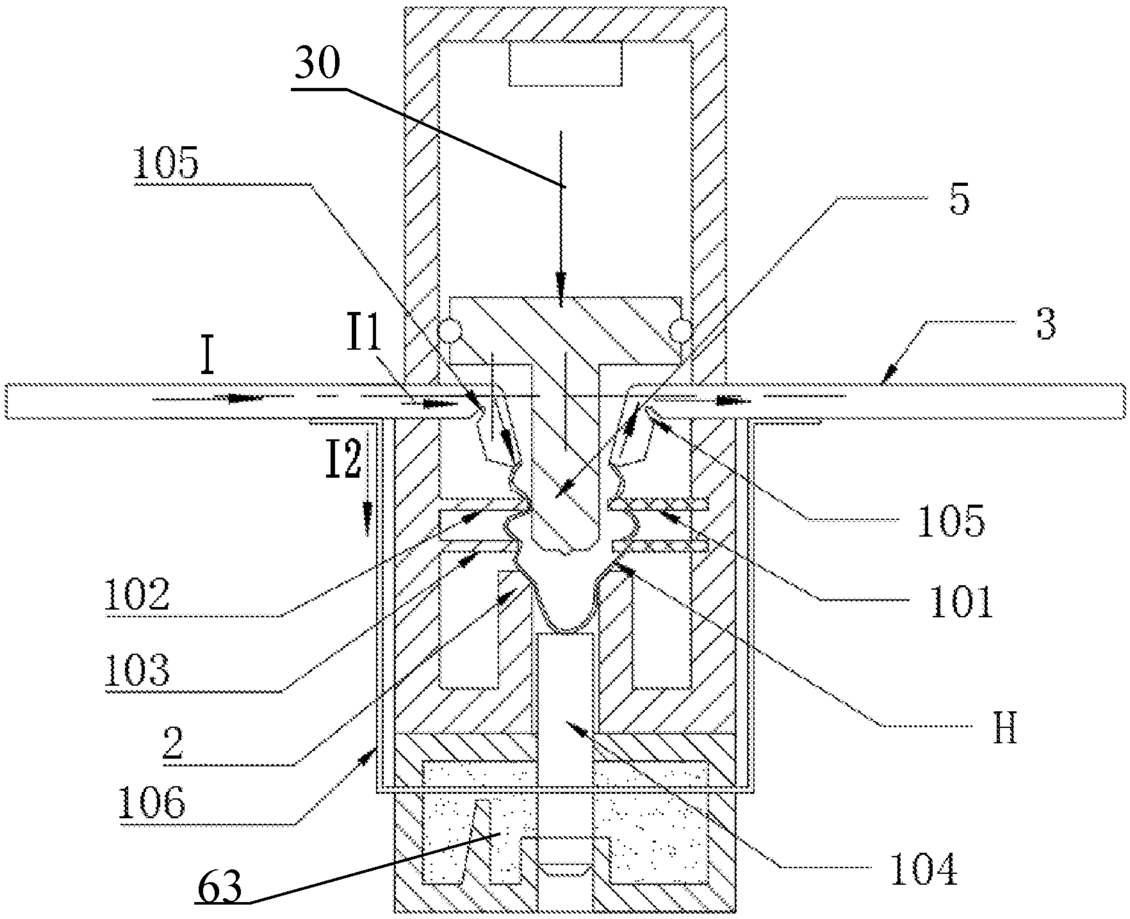
FIG. 10 is a schematic view of a fuse of the present disclosure with another optional structure when the conductor is broken and an U-shaped arc is generated.

Further, as shown in FIG. 10, FIG. 10 shows an embodiment in which two rotating weak portions 105 are provided at two sides of the weak to-be-broken portion of the conductor 3 to form a double-door pushing structure. After the breaking device 5 breaks the conductor 3, the moving part of the breaking device 5 passes through the gap formed by the rotation of the conductor 3;

when a current flows through the conductor 3, an arc is formed between the two segments of the broken conductor 3, and the arc is subjected to an action of the moving part of the breaking device 5 and an action of an electromotive force, to surround a head of the moving part, and continues to move and elongate.

Based on the double-door structure, the arc extinguishing structure is located in or near the arc movement path of the double-door pushing structure, for extinguishing the arc between the two parts of the conductor 3 broken. In the above, the head of the moving part may be made of insulating materials to cool the arc to help extinguishing the arc; the head of the moving part may also be coated with an insulating material that can produce gas to help extinguishing the arc; a metal arc extinguishing grid, an insulating arc extinguishing grid or a slit may also be provided in the front of the moving direction of the head of the moving part to help extinguishing the arc.

For example, in FIG. 10, as shown on the right side, a metal arc extinguishing grid 101 may be embedded to segment the arc and cool the arc; or as shown on the left side, an insulating protrusion 102 may be provided spacedly in a protruding manner or an insulating sheet 103 may be provided spacedly to constitute an insulating gap arc extinguishing structure, so that the arc extends along the surface of the insulating wall, elongates the path of the arc, and realizes arc extinguishing by slit and arc extinguishing by cooling; the housing 2 below the fracture can also be coated with a coating that can generate gas under the action of the arc, so that the arc spreads to the surrounding space and is cooled for arc extinguishing. These methods can be implemented individually or may be implemented in combination. With the above double-door structure, a symmetrical U-shaped arc H can be formed after the conductor is broken at a single portion. The electromotive force of the huge arc acts on the electrically conductive particles, which allows the arc to move into the front space faster than the head of the breaking device 5 at a movement speed which may exceed several kilometers per second, and the arc is rapidly elongated, where the longer the arc length is, the greater the arc resistance will be, the faster the arc voltage increases, and the easier the arc is extinguished. The above arc extinguishing structure is provided on the wall of the housing and in the space in the front of the moving direction of the U-shaped arc, which can increase the arc voltage, and allow a branching current of the current (I), i.e., the current of the conductor 3 (current in I1 direction) to be transferred faster onto the fusant 106 (current in I2 direction), to fuse and break the fusant 106 faster; and the arc is further elongated to cool the arc, and the insulation resistance effect is established faster, so as to withstand the overvoltage when the fusant 106 is fused to be broken, preventing breakdown.

In the above, breaking the fusant 106 can be in the form of rotating pressing block as described below, or in the form in FIG. 8 where the push rod 81 and the guide rod 82 break it together, or in the form of rotating to break in FIG. 9. In FIG. 10, a tensile rod 104 is used, and the fusant 106 penetrates through the tensile rod 104. When the breaking device 5 further moves downward and pushes the tensile rod 104 to move downward, the fusant 106 may be tensed to be broken, where the fracture may be wrapped by the surrounding arc-extinguishing medium 63, and the tensile rod 104 maintains a sealed fit with the housing to prevent the arc-extinguishing medium 63 from leaking out.

Based on FIG. 1, the force applying assembly comprises two sets of clamping assemblies 74 provided at interval on the fusant 70, and a breaking notch 75 is formed between the two sets of clamping assemblies 74 to facilitate breaking of the fusant 70. Each set of clamping assemblies 74 comprises a pair of pressing blocks 71 provided on two faces of the fusant 70. The adjacent faces of the two pressing blocks 71 on the same side of the fusant 70 are both arc-shaped faces, so that a horn-shaped breaking notch 75 can be formed between the two sets of clamping assemblies 74, to facilitate the piston impact end to enter the breaking notch 75 to break the fusant 70. Two ends of the pressing block 71 are fixed on the housing by a rotating shaft 73. The arc extinguishing chamber 72 is located on two sides of the two sets of clamping assemblies 74.

After the breaking device 5 breaks the conductor 3, its impact end enters the breaking notch 75 between the two sets of pressing blocks 71, and then breaks the fusant 70 through the breaking notch 75; at the same time, the arc-shaped faces of the pressing blocks 71 are squeezed by the breaking device 5, and the pressing blocks 71 drive the fusant 70 located therebetween to rotate along the rotating shaft 73, so that the fusant 70 located at two ends of the pressing blocks 71 is broken. A plurality of fractures are formed on the fusant 70. As can be seen from FIGS. 5 and 6, two ends of the fusant 70 are connected in parallel on the conductors 3 at two sides of the plurality of fractures. Since the three fractures are formed at the same time, most of the overcurrent energy passes through the fusant 70 connected in parallel at the three fractures. Due to the series partial pressure of the three fractures, the arc generated at each fracture is very small, and it is easy to realize arc extinguishing by air, where the insulation performance at the fracture will be quickly restored. The fusant 70 is fused in the arc extinguishing medium 63 while being mechanically broken by the breaking device 5, forming at least two fractures. With the participation of the partial pressure and the arc extinguishing medium 63, the arc at the fracture of the fusant 70 is also quickly arc-extinguished.

Figure 7:
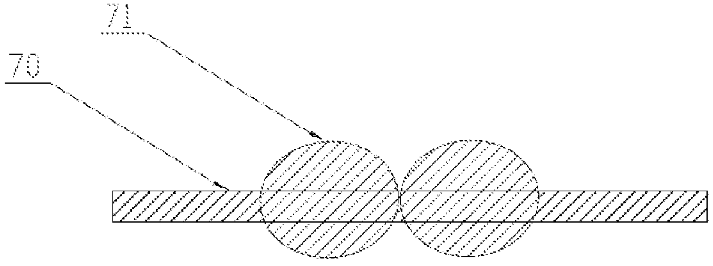
FIG. 7 is a structural schematic view of the pressing block in FIG. 5 with an arc-shaped face.

In order to allow a much smooth running of the pressing block 71 after the breaking, the surfaces of the pressing blocks 71 located on opposite sides of the fusant 70 are protruding arc-shaped faces. The top face or the bottom face of the pressing block 71 in FIG. 7 is arc-shaped. In this way, a horn-shaped breaking notch 75 is formed between the two sets of pressing blocks 71. The cavity wall of the cavity 30 where the pressing blocks 71 are located may have an arc-shaped face matching the arc-shaped faces of the pressing blocks 71. After the fusant 70 is broken, the pressing block 71 can rotate smoothly along the arc-shaped face of the cavity 30. The fusant 70 located on two sides of the pressing blocks 71 is placed in an arc extinguishing chamber 72 in the housing, and the arc extinguishing chamber 72 is filled with an arc extinguishing medium 63.

As force applying assemblies for applying force to the fusant 40, the above clamping assemblies in FIGS. 3 and 5 can be driven through the breaking device 5 to displace, then the fusant 40 is broken. Although the clamping assemblies are located outside the arc extinguishing chamber 72, the weak to-be-broken portion 31 may be located outside the arc extinguishing chamber 72 or may be located inside the arc extinguishing chamber 72. If the weak to-be-broken portion 31 is located inside the arc extinguishing chamber 72, when the fusant 40 is tensed to be broken, the broken part can be detached from the arc extinguishing chamber 72 and enter the cavity 30 of the housing.

The force applying assembly and the fusant similar to those in FIGS. 3 and 6 may also be located in the arc extinguishing chamber 60. Since the arc extinguishing chamber 60 is filled with the arc extinguishing medium, it is sufficient if the clamping assemblies drive the fusant to displace in the arc extinguishing medium to be broken and the arc extinguishing medium will not leak.

Figure 8:
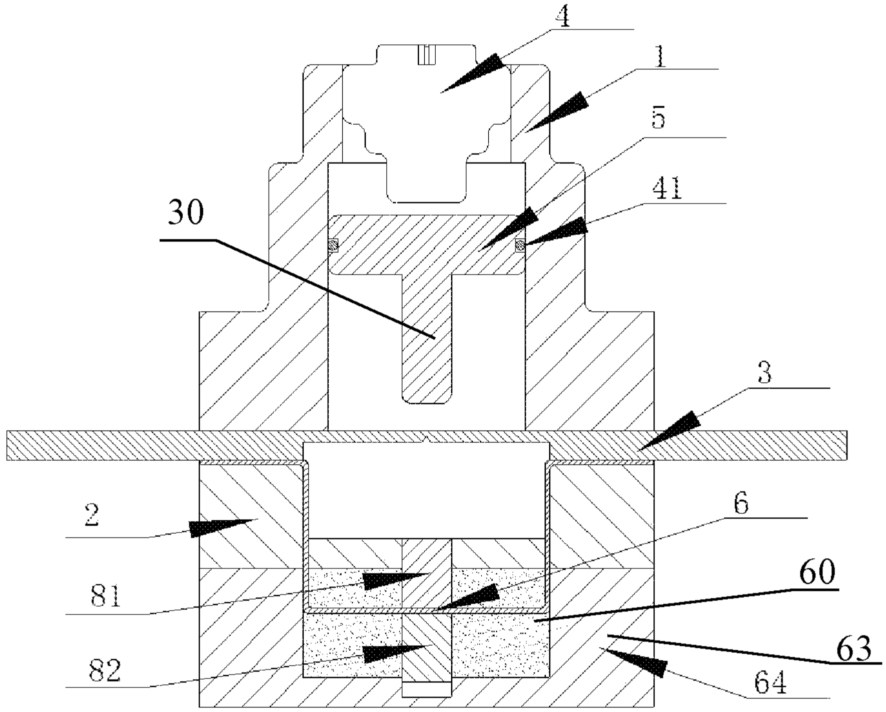
FIG. 8 is a structural schematic view in which the push rod and the guide rod of the fusant are located in an arc extinguishing chamber.

Referring to FIG. 8, the force applying assembly and the fusant 6 are located in the arc extinguishing chamber 60. In FIG. 8, the force applying assembly is a clamping assembly clamping the fusant 6. Specifically, a push rod 81 and a guide rod 82 are provided opposite to each other on two sides of the fusant 6 to form the clamping assembly. An upper end of the push rod 81 penetrates upward through the wall of the arc extinguishing chamber 60; its upper end may extend out of the wall of the arc extinguishing chamber 60. It may not extend out. When it does not extend out, the impact end of the piston needs to enter the wall of the arc extinguishing chamber 60 to drive the push rod 81.

The surroundings of the push rod 81 and the guide rod 82 are wrapped by the arc extinguishing medium 63, and part of the fusant 6 is also wrapped by the arc extinguishing medium 63, to ensure that the fusant 6 is also wrapped by the arc extinguishing medium 63 after being broken by the push rod 81 and the guide rod 82, so as to improve the arc extinguishing effect. Further, the conductor 3 and the fusant 6 of the present disclosure have a two-segment disconnected/broken structure, and the conductor 3 is a copper bar with a larger cross section and the fusant 6 has a smaller cross section. The conductor 3 with a large cross-section has a strong through-current capacity, a low resistance, and a low temperature rise, but it has a weak breaking capacity and a slow arc extinguishing speed, when broken individually. The fusant 6 in the arc extinguishing medium 63 has a smaller cross-section, and it is easier to be pulled to be broken, and it has a stronger breaking capacity and a fast arc extinguishing speed, but a weak current-carrying capacity. By connecting the two in parallel and breaking them sequentially, the current-carrying and breaking capacity can be taken into consideration, and the breaking speed can be improved. This design can also allow the overall weight of the fuse lighter and the volume smaller.

In detail, the conductor 3 (the main copper bar) is first broken, and the current is transferred to the fusant 6 connected in parallel. In this case, the insulation capacity of the medium at the main copper bar fracture restores (an arc will be generated at the moment of breaking, which reduces the insulation capacity of the medium at the fracture, which is easy to be broken down), it is not easy to be broken down again, and the reliability of breaking can be improved.

Breaking is implemented by breaking twice quickly, where the electrically conductive copper bar is firstly broken, and then the fusant 6 is broken, which can greatly shorten the time for arc extinguishing and realize a rapid protection.

The process where the fusant 6 is broken when a current flowing therethrough is as follows.

In the case of a large current, the fusant 6 is quickly fused and broken in the arc extinguishing medium 63, the circuit is disconnected, and the fusant 6 is tensed to be broken by the push rod 81 that moves downward, which further enhances the insulation capacity (there is a low arc energy in the case of a large current, the fusing speed is fast, the fusant 6 has a large fusing-formed fracture, and the arc is easy to be extinguished).

In the case of a medium current, in the course where the fusant 6 is fused and broken in the arc extinguishing medium 63, the fusant 6 is pulled to be broken by the push rod 81 that moves downward, and the fracture formed by the pulling moves in the arc extinguishing medium 63 (such as sand), and the fracture formed by the pulling and the fusing-formed fracture work together to extinguish the arc, establishing an insulation.

In the case of a small current, the fusant 6 is not fused in the arc extinguishing medium 63, and the fusant 6 is pulled to be broken by the push rod 81 that moves downward, and the fracture formed by the pulling moves in the arc extinguishing medium 63 (such as sand), thereby extinguishing the arc and establishing an insulation environment (there is a low arc energy in the case of a small current, and the fusing speed is slow, but the arc generated during pulling in the arc extinguishing medium 63 is easily extinguished).

In detail, the two segments of the broken fusant 6 are a cathode and an anode respectively, and there is an arc path between the cathode and the anode; and the cathode and/or the anode remains in the arc extinguishing medium 63, and a part or all of the arc path is in the arc extinguishing medium 63. In more detail, when the cathode is in the arc extinguishing medium 63, the anode is in a slit between the push rod 81 and the housing; or, when the anode is in the arc extinguishing medium 63, the cathode is in the slit between the push rod 81 and the housing.

Further, between the push rod 81 and the fusant 6, or between the guide rod 82 and the fusant 6, there is no gap or there is a tiny gap, with the tiny gap having a size not sufficient for the arc generated between the two segments of the broken fusant 6 to pass therethrough. In the case of using a structure with a tiny gap, the arc extinguishing medium 63 is a solid arc extinguishing medium, so that a wall with better blocking effect is formed among the push rod 81, the guide rod 82 and the fusant 6 to avoid airflow conduction under the arc pressure, and since there will be no arc extinguishing medium 63 passing through the gap, the barrier effect will not be affected, and the filling density of the arc extinguishing medium 63 will not be affected. In this way, before and after being broken, the fusant 6 will not have a large air space for the arc breaking through, which can improve the arc extinguishing effect.

In order to facilitate the movement of the push rod 81 and the guide rod 82, the frictional force of the push rod 81 and the guide rod 82 during movement may be reduced, and the vibration and noise during breaking can be reduced, by designing the length direction of the push rod 81 and the guide rod 82 to be parallel to the moving direction, and by further designing as a smooth surface the surface of the housing in contact with the arc extinguishing medium 63. Moreover, with a smoother movement and a smaller resistance, there will be less friction between the fracture of the conductor 3 and the breaking device 5, and between the fracture of the fusant 6 and the arc extinguishing medium 63, which can help cooling and reduce friction-caused heat.

A lower end of the guide rod 82 is provided to be inserted downwards in the wall of the arc extinguishing chamber 60. A gap for the displacement of the guide rod 82 is retained between the lower end of the guide rod 82 and the wall of the arc extinguishing chamber 60. The gap allows the push rod 81 and the guide rod 82 to break the fusant 6 to form a fracture on the fusant 6.

In order to reduce the noise generated when the guide rod 82 is displaced, a buffer layer may be provided at the bottom of the gap. The lower end of the guide rod 82 may also extend out of the wall of the arc extinguishing chamber 60. For this structure, it is most preferable to provide a housing with a cavity 30 on the housing at the bottom of the arc extinguishing chamber 60, to allow the guide rod 82 to move in the housing. In FIG. 8, the contact between the push rod 81 and the guide rod 82 and the arc extinguishing chamber 60 is an interference fit, to prevent the arc extinguishing medium 63 from leaking. It is also possible to provide a seal between the contact surfaces of the push rod 81, the guide rod 82 and the arc extinguishing chamber 60 for sealing. When the push rod 81 and the guide rod 82 are sealed with a seal, the push rod 81 and the guide rod 82 are respectively fixed on the housing by a positioning structure (not shown) to maintain the initial positions. The positioning structure may be a protruding block on the push rod 81 or the guide rod 82 and nested on the housing. The weak to-be-fused portion and the weak to-be-broken portion 31 of the fusant 6 are both set on the fusant 6 located in the arc extinguishing chamber 60. The push rod 81 and the guide rod 82 may be provided directly facing each other, or may be provided not directly facing each other, or one push rod 81 pushes several guide rods 82 to act, or a plurality of push rods 81 drive one guide rod 82 to move. It is sufficient if the push rod 81 can drive the guide rod 82 to displace together.

Since the breaking of the fusant 6 is implemented by the push rod 81 and the guide rod 82, the conductor 3 will not be in contact with the fusant 6 after being broken, and the first stage of movement is completed after the breaking device breaks the conductor 3. When it abuts against the push rod 81 and pushes the push rod 81, it is the second stage of movement. The two-stages of movement will not interfere, and there will be no conductor 3 falling to touch the fusant 6, which can avoid the arc generated when the fusant 6 is broken from affecting the surrounding structure or breaking down the surrounding air through the falling conductor 3, thereby improving the arc extinguishing effect.

In FIG. 8, the force applying assembly is driven by the breaking device 5 to move linearly, and the structure of the clamping assembly may also be changed to make it perform a rotational movement to break the fusant 6.

Figure 9:
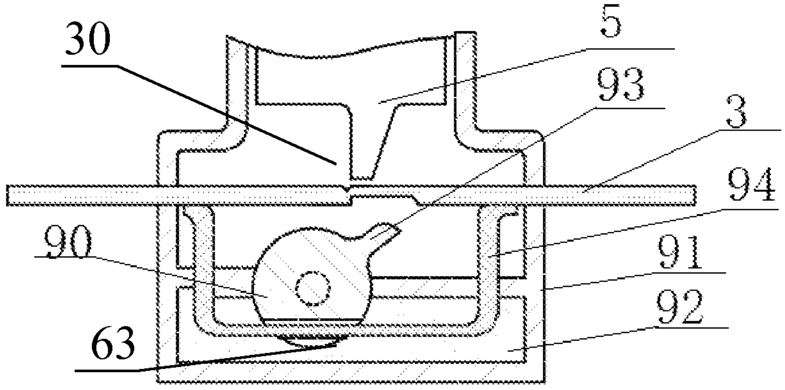
FIG. 9 is a structural schematic view of a force applying assembly that is provided in the arc extinguishing chamber to break the fusant in a rotating manner.

Referring to FIG. 9 which is a simple structural schematic view in which the force applying assembly is a rotating assembly for breaking the fusant 94 in a rotational displacement manner. The rotating assembly comprises a rotating member 90 provided in the arc extinguishing chamber 92, and the rotating member 90 is fixed on the housing 91 via a rotating shaft. A part of the rotating member 90 extends into the arc extinguishing chamber 92 and serves as a trigger member. The rotating member 90 is in sealed contact with the wall of the arc extinguishing chamber 92. The sealing contact is a sealing by seal or interference fit. The rotating member 90 located outside the arc extinguishing chamber 92 is provided with a rotating handle 93 (that is, the above trigger member). The rotating handle is provided as a structure meeting the requirement that the impact end of the breaking device 5 can squeeze the rotating handle to drive the rotating member 90 to rotate. The rotating member 90 located in the arc extinguishing chamber 92 is provided with a structure such as a clamping groove for fixing the fusant 94 or a clamping hole for allowing the fusant 94 to pass therethrough, where the direction for providing the clamping groove and the direction for providing the clamping hole are perpendicular to the axial direction of the rotating shaft, that is, the rotating member 90 can abut against or clamp the fusant 94, to make the fusant 94 fixed on the rotating member 90, and when the rotating member 90 rotates, the fusant 94 can be broken to form a fracture. The parts of the broken fusant 94 are a cathode and an anode, respectively, and there is an arc path between the cathode and the anode; and the cathode and/or the anode remains in the arc extinguishing medium 63, and a part or all of the arc path is in the arc extinguishing medium 63.

When the cathode is in the arc extinguishing medium 63, the anode is in a slit between the rotating member 90 and the housing; or, when the anode is in the arc extinguishing medium 63, the cathode is in the slit between the rotating member 90 and the housing.

The above fusant 94 may be directly connected to the conductor 3 through two ends of the fusant 94, and the fusant 94 may also be connected to the conductor 3 through a connecting wire. In the above illustrations, the breaking device 5 is a piston structure.

The working principle and the arc extinguishing principle are illustrated by taking the structure of FIG. 1, the excitation device 4 as a gas generating device, and the breaking device 5 as a piston as an example.

The working principle is as follows.

First, the gas generating device receives an external excitation signal and ignites, where the excitation signal is generally an electrical signal. When the gas generating device ignites, it releases high-pressure gas through a chemical reaction, and drives the piston through the high-pressure gas to move. Under the action of the high-pressure gas, the piston overcomes the limiting of the limiting structure and displaces towards the conductor 3, to break the conductor 3 from the weak to-be-broken portion 31 to form a fracture on the conductor 3; in this case, the fusant 6 has not been broken; since the resistance at the fracture of the conductor 3 is much greater than the resistance of the fusant 6, most of the current flows through the fusant 6, and only a small part of the current at the fracture of the conductor 3 generates an arc, the fracture at the conductor 3 will not cause ablation, and the arc extinguishing medium 63, such as air, at the conductor 3 will quickly restore the insulation performance. When most of the current flows through the fusant 6, the temperature will rise rapidly due to the larger resistance at the weak to-be-fused portion of the fusant 6, and the fusant 6 will begin to fuse; while the fusant 6 is fused to be broken, the piston continues to move downward, the fusant 6 is broken and a fracture is formed on the fusant 6, until the piston stops moving, the action ends, and the circuit is disconnected. When the fusant 6 is broken, since the overcurrent discharges at least 30% of the energy through the facture of the conductor 3, the current will not generate a large arc at the fusant 6. In the case of a smaller overcurrent, the fusant 6 will not be broken fusing, but the fusant 6 will be mechanically broken, which ensures that the fuse is broken.

The arc extinguishing principle is as follows.

In the case of zero current dividing/breaking, or in the case that it is not sufficient to fuse and break the fusant 6 under the low multiple fault current, the conductor 3 and the fusant 6 are sequentially broken by the piston to disconnect the fuse. Due to the smaller fault current, the arc formed at the fracture of the conductor 3 and the fracture of the fusant 6 is also smaller, and it is easy to extinguish the arc.

In the case of the medium multiple fault current, after a fracture is formed in the conductor 3, most of the fault current passes through the fusant 6. Due to the larger fault current, the fusant 6 is also broken by the piston while the fusant 6 starts to be fused at the weak to-be-fused portion. The arc at the fracture on the fusant 6 formed by breaking by the piston is elongated and squeezed due to the continuous displacement of the piston. When the arc is elongated and squeezed, the arc extinguishing becomes easy until the arc is extinguished; and the arc generated at the fracture where the fusant 6 in the arc extinguishing medium 63 is fused is extinguished in the arc extinguishing medium 63.

In the case of a large multiple fault current, after the conductor 3 is broken, most of the fault current is completely transferred to the fusant 6, and there is very small arc generated at the fracture on the conductor 3, and in addition, the piston movement elongates and squeezes the arc at the position, which allows the arc at the fracture of conductor 3 to be easily extinguished; due to the large fault current, a lot of heat is generated at the weak to-be-fused portion of the fusant 6 and the fusant is fused to be broken rapidly, where the arc extinguishing medium 63 participates in the arc extinguishing, and the arc is quickly extinguished, and then the piston continues to move downwards to break the fusant 6 and form a physical fracture to ensure that the fuse is completely disconnected.

A reliable physical fracture is formed by breaking twice quickly, and the insulation performance is excellent after the breaking.

The above description is only preferred embodiments of the present disclosure, and is not intended to limit the disclosure, and various changes and modifications may be made to the present disclosure for those skilled in the art. Any modifications, equivalents, improvements, etc., made within the spirit and principle of the present disclosure, are intended to be included within the protection scope of the present disclosure.

INDUSTRIAL APPLICABILITY

The fuse of the present disclosure has the following advantages: the current circulates through two ends of the electrically conductive plate connected in series on the loop of the protection system, without adversely affecting the fusant; because the electrically conductive plate has a large cross-section and a low resistance, it has a low heat generation and a low power consumption, and has a good resistance to current impact; in the course of breaking, with the combination of fast cutting and arc extinguishing principle by the fuse, the breaking capacity is basically not affected by air pressure, temperature and humidity, and the arc extinguishing ability is improved, so it can break larger fault currents and improve the breaking capacity; breaking is implemented by breaking twice quickly, where the electrically conductive copper bar is firstly broken, and then the fusant is broken, which can greatly shorten the time for arc extinguishing and realize a rapid protection; a reliable physical fracture is formed by breaking twice quickly, and the insulation performance is excellent after the breaking; the outer housing is designed to be sealed with no vents, which can prevent foreign objects from contaminating the fracture, and can also prevent high-temperature arcs from being sprayed out of the housing to damage surrounding devices, improving the protection level.

The invention claimed is:

1. An excitation fuse with a conductor and a fusant being sequentially broken, the excitation fuse comprising a housing and a cavity in the housing, wherein at least one conductor is inserted in the housing and the cavity and configured to have two ends connected with an external circuit; at least one fusant is provided in parallel on each of the at least one conductor; an excitation device and a breaking device are mounted in the cavity at one side of the each conductor; the excitation device is configured to receive an external excitation signal to act to drive the breaking device to sequentially form at least one fracture on the each conductor and the each fusant respectively; and the at least one fracture on the each conductor is connected in parallel with the each fusant, wherein at least one set of force applying assemblies is provided on the fusant located in the housing, and the force applying assembly is configured to be driven by the breaking device, to break the fusant to form the fracture; and the force applying assembly comprises at least one push rod and at least one guide rod, the arc extinguishing medium is filled around the push rod and the guide rod, and the fusant is located between the push rod and the guide rod; one end of the push rod penetrates through and extends out of the arc extinguishing chamber; one end of the guide rod displaces into a reserved displacement space in the arc extinguishing chamber; a blocking structure configured to prevent leakage of the arc extinguishing medium is provided between the push rod and the guide rod and a wall of the arc extinguishing chamber; after the breaking device breaks the conductor, the breaking device drives the push rod and the guide rod to displace in a linear manner to break the fusant, where two segments of the broken fusant are a cathode and an anode respectively, with an arc path between the cathode and the anode; and the cathode and/or the anode remains in the arc extinguishing medium, and at least a part of the arc path is in the arc extinguishing medium.

2. The excitation fuse according to claim 1, wherein the housing is provided with a closed arc extinguishing chamber filled with an arc extinguishing medium; and at least a part of the each fusant is located in the arc extinguishing medium.

3. The excitation fuse according to claim 1, wherein the force applying assembly is provided on the fusant located outside the arc extinguishing medium; the force applying assembly comprises at least one set of clamping assemblies clamping the fusant; the breaking device is configured to drive, after breaking the conductor, the clamping assemblies to break the fusant in a linear or rotational displacement manner to form the fracture, wherein when the fusant is broken in a rotating manner, two ends of the clamping assemblies are fixed on the housing by a rotating shaft.

4. The excitation fuse according to claim 3, wherein at least one set of the clamping assemblies is provided on each fusant, and a breaking notch is formed between the clamping assemblies; and the breaking device is configured to impact, after breaking the each conductor, the breaking notch to break the each fusant.

5. The excitation fuse according to claim 3, wherein the each conductor has at least one rotating weak portion, wherein the breaking device breaks the each conductor, the fracture is formed at each weak to-be-broken portion of weak to-be-broken portions of the each conductor, and the rotating weak portion is provided at one side or two sides of the weak to-be-broken portion to form a single-door or double-door pushing structure, the broken conductor is pushed away by the breaking device and rotate around the rotating weak portion as a shaft without moving along with the breaking device, and a moving part of the breaking device passes through a gap formed by rotation of the each conductor.

6. The excitation fuse according to claim 5, wherein the rotating weak portion of the each conductor is provided at two sides of the weak to-be-broken portion of the each conductor to form the double-door pushing structure, wherein after the breaking device breaks the each conductor, the moving part of the breaking device passes through the gap formed by the rotation of the each conductor; when a current flows through the each conductor, an arc is formed between two segments of the broken conductor, and the arc is driven, under an action of the moving part of the breaking device and an action of an electromotive force, to surround a head of the moving part, and continues to move and elongate.

7. The excitation fuse according to claim 6, wherein an arc extinguishing structure is provided inside the housing, and the arc extinguishing structure is located in an arc movement path of the double-door pushing structure, for extinguishing the arc between the two parts of the broken conductor.

8. The excitation fuse according to claim 3, wherein the breaking device comprises an impact end of an insulating material, the impact end of the insulating material forms an insulating wall with the housing after breaking the each conductor, and the insulating wall separates the parts of the broken conductor at the two sides.

9. The excitation fuse according to claim 8, wherein the breaking device comprises a fusant impact end, the fusant impact end is located at two sides of the impact end of the insulating material, wherein before the breaking device works, a distance from the impact end of the insulating material to the each conductor is smaller than a distance from the fusant impact end to the each fusant.

10. The excitation fuse according to claim 1, wherein when the cathode is in the arc extinguishing medium, the anode is in a slit between the push rod and the housing.

11. The excitation fuse according to claim 10, wherein between the push rod and the fusant, no gap is provided or a tiny gap is provided, with the tiny gap having a size not sufficient for allowing an arc generated between the two segments of the broken fusant to pass therethrough.

12. The excitation fuse according to claim 1, wherein the force applying assembly comprises a rotating member rotatably provided in the arc extinguishing chamber and a trigger member located outside the arc extinguishing chamber; the rotating member abuts against or clamps the fusant; a blocking structure configured to prevent leakage of the arc extinguishing medium is provided between the rotating member and the arc extinguishing chamber; after the breaking device breaks the conductor, the breaking device can drive the trigger member to drive the rotating member to rotate, to break the fusant in a rotational displacement manner; and the segments of the broken fusant are a cathode and an anode respectively, with an arc path between the cathode and the anode; and the cathode and/or the anode remains in the arc extinguishing medium, and at least a part of the arc path is in the arc extinguishing medium.

13. The excitation fuse according to claim 12, wherein when the cathode is in the arc extinguishing medium, the anode is in a slit between the rotating member and the housing.

14. The excitation fuse according to claim 13, wherein the excitation device is a gas generating device, an air cylinder, or a hydraulic cylinder configured to receive the external excitation signal to act, wherein when the excitation device is the gas generating device, the breaking device is in sealed contact with a side wall of the housing.

15. The excitation fuse according to claim 13, wherein a weak to-be-broken portion that reduces a mechanical strength of the each conductor and facilitates breaking by the breaking device is provided on the each conductor and/or the each fusant.

16. The excitation fuse according to claim 13, wherein the breaking device is provided with at least one impact end, and the impact end is provided as a contracted end face structure, a pointed structure, a beveled knife line structure, or a structure with two pointed ends and a concave middle.

17. The excitation fuse according to claim 12, wherein the blocking structure is a seal provided between the force applying assembly and the wall of the arc extinguishing chamber; or the force applying assembly and the wall of the arc extinguishing chamber have an interference fit therebetween; or when the arc extinguishing medium is solid-granular, a gap between the force applying assembly and the wall of the arc extinguishing chamber is smaller than a particle diameter of the arc extinguishing medium.

18. An alternative fuel vehicle using or comprising the excitation fuse according to claim 1.

19. The excitation fuse according to claim 6, wherein an arc extinguishing structure is provided inside the housing, and the arc extinguishing structure is located near an arc movement path of the double-door pushing structure, for extinguishing the arc between the two parts of the broken conductor.

20. The excitation fuse according to claim 8, wherein the fusant impact end is located below the impact end with insulating materials and is connected in series with the impact end with insulating materials, wherein before the breaking device works, a distance from the impact end with insulating materials to the conductor is smaller than a distance from the fusant impact end to the fusant.

21. The excitation fuse according to claim 1, wherein when the anode is in the arc extinguishing medium, the cathode is in the slit between the push rod and the housing.

22. The excitation fuse according to claim 10, wherein between the guide rod and the fusant, no gap is provided or a tiny gap is provided, with the tiny gap having a size not sufficient for allowing an arc generated between the two segments of the broken fusant to pass therethrough.

23. The excitation fuse according to claim 12, wherein when the anode is in the arc extinguishing medium, the cathode is in the slit between the rotating member and the housing.

24. The excitation fuse according to claim 13, wherein the excitation device is a gas generating device, an air cylinder, or a hydraulic cylinder configured to receive the external excitation signal to act, wherein when the excitation device is the gas generating device, there is a gap less than 0.1 mm therebetween.

25. The excitation fuse according to claim 12, wherein the force applying assembly and the wall of the arc extinguishing chamber have an interference fit therebetween.

26. The excitation fuse according to claim 12, wherein when the arc extinguishing medium is solid-granular, a gap between the force applying assembly and the wall of the arc extinguishing chamber is smaller than a particle diameter of the arc extinguishing medium.

27. An excitation fuse with a conductor and a fusant being sequentially broken, the excitation fuse comprising a housing and a cavity in the housing, wherein at least one conductor is inserted in the housing and the cavity and configured to have two ends connected with an external circuit; at least one fusant is provided in parallel on each of the at least one conductor; an excitation device and a breaking device are mounted in the cavity at one side of the each conductor; the excitation device is configured to receive an external excitation signal to act to drive the breaking device to sequentially form at least one fracture on the each conductor and the each fusant respectively; and the at least one fracture on the each conductor is connected in parallel with the each fusant, wherein at least one set of force applying assemblies is provided on the fusant located in the housing, and the force applying assembly is configured to be driven by the breaking device, to break the fusant to form a fracture; and the force applying assembly comprises at least one push rod and at least one guide rod, the arc extinguishing medium is filled around the push rod and the guide rod, and the fusant is located between the push rod and the guide rod; one end of the push rod penetrates through and extends out of the arc extinguishing chamber; one end of the guide rod displaces to extend out of the arc extinguishing chamber; a blocking structure configured to prevent leakage of the arc extinguishing medium is provided between the push rod and the guide rod and the wall of the arc extinguishing chamber; after the breaking device breaks the conductor, the breaking device drives the push rod and the guide rod to displace in a linear manner to break the fusant, where two segments of the broken fusant are a cathode and an anode respectively, with an arc path between the cathode and the anode; and the cathode and/or the anode remains in the arc extinguishing medium, and at least a part of the arc path is in the arc extinguishing medium.

* * * * *